US010381704B2

(12) United States Patent
Talty et al.

(10) Patent No.: US 10,381,704 B2
(45) Date of Patent: Aug. 13, 2019

(54) EMBEDDED BROADBAND GLASS COPLANAR WAVEGUIDE COUPLER

(71) Applicant: GM GLOBAL TECHNOLOGY OPERATIONS LLC, Detroit, MI (US)

(72) Inventors: Timothy J. Talty, Beverly Hills, MI (US); Walter S. Wall, Santa Monica, CA (US); James H. Schaffner, Chatsworth, CA (US); Hyok Jae Song, Oak Park, CA (US); Duane S. Carper, Davison, MI (US); Eray Yasan, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 19 days.

(21) Appl. No.: 15/431,091

(22) Filed: Feb. 13, 2017

(65) Prior Publication Data

US 2017/0237139 A1 Aug. 17, 2017

Related U.S. Application Data

(60) Provisional application No. 62/295,845, filed on Feb. 16, 2016.

(51) Int. Cl.
*H01P 5/02* (2006.01)
*H01P 3/00* (2006.01)
(Continued)

(52) U.S. Cl.
CPC .............. *H01P 5/028* (2013.01); *H01P 3/003* (2013.01); *H01P 5/02* (2013.01); *H01Q 1/1271* (2013.01);
(Continued)

(58) Field of Classification Search
CPC .. H01P 5/02; H01P 5/022; H01P 3/003; H01P 5/028; H01P 5/22; H01Q 1/1271; H01Q 1/241; B60J 1/00; B60J 1/18
(Continued)

(56) References Cited

U.S. PATENT DOCUMENTS 5,278,572 A * 1/1994 Harada ................ H01Q 1/1285
343/713
5,565,877 A 10/1996 Du et al.
(Continued)

FOREIGN PATENT DOCUMENTS

CN 102280708 A 12/2011
CN 203326077 U 12/2013
(Continued)

OTHER PUBLICATIONS

Nedil, Mourad et al. "Novel Butler Matrix Using CPW Multi-Layer Technology" IEEE Transactions on Microwave Theory and Techniques, vol. 54, No. 1, Jan. 10, 2006, pp. 499-507.
(Continued)

*Primary Examiner* — Rakesh B Patel
*Assistant Examiner* — Jorge L Salazar, Jr.
(74) *Attorney, Agent, or Firm* — Cantor Colburn LLP (57) ABSTRACT

An electromagnetic coupler that couples antenna signals for a wideband antenna positioned between glass layers of an automotive windshield. The coupler includes a first coplanar waveguide (CPW) formed on one side of a glass layer and a second CPW formed on the other side of the glass layer, where the first and second CPWs are a mirror, or near-mirror, and 180° rotated images of each other. Both the first and second CPWs include a conductive plane where removed portions of the plane define a wide CPW section and a narrow CPW section that are electrically coupled to each other, and where the remaining portions of the con-
(Continued)

ductive plane are ground planes, and where the electromagnetic signals are coupled through the glass layer between the wide CPW sections.

20 Claims, 5 Drawing Sheets

(51) Int. Cl.
    *H01Q 1/12*     (2006.01)
    *H01Q 1/32*     (2006.01)
    *H01Q 1/24*     (2006.01)
    *B60J 1/18*     (2006.01)
    *B60J 1/00*     (2006.01)
    *B60J 1/02*     (2006.01)

(52) U.S. Cl.
    CPC ............. *H01Q 1/241* (2013.01); *H01Q 1/325* (2013.01); *B60J 1/00* (2013.01); *B60J 1/02* (2013.01); *B60J 1/18* (2013.01)

(58) Field of Classification Search
    USPC .................................. 333/24 R, 24 C, 32, 33
    See application file for complete search history.

(56) References Cited

U.S. PATENT DOCUMENTS

| | | |
|---|---|---|
| 5,899,408 A | 5/1999 | Bowers, Jr. |
| 6,172,651 B1 | 1/2001 | Du |
| 6,661,386 B1 | 12/2003 | Petros et al. |
| 7,091,915 B1 | 8/2006 | Truthan et al. |
| 8,686,906 B2 | 4/2014 | White et al. |
| 2015/0236393 A1 | 8/2015 | Saji et al. |
| 2016/0149281 A1* | 5/2016 | Hung ..................... H01P 3/003 333/238 |

FOREIGN PATENT DOCUMENTS

| | | |
|---|---|---|
| CN | 104091992 A | 10/2014 |
| CN | 204130669 U | 1/2015 |
| JP | 2010192987 A | 9/2010 |

OTHER PUBLICATIONS

Chinese First Office Action for Application No. 201710350059.7 dated Mar. 4, 2019; 13 pgs.

* cited by examiner

EMBEDDED BROADBAND GLASS COPLANAR WAVEGUIDE COUPLER

CROSS-REFERENCE TO RELATED APPLICATIONS

This application claims the benefit of the priority date of U.S. Provisional Patent Application Ser. No. 62/295,845, titled, Embedded Broadband Glass Coplanar Waveguide Coupler, filed Feb. 16, 2016.

BACKGROUND OF THE INVENTION

Field of the Invention

This invention relates generally to an electromagnetic coupler for coupling antenna signals through a dielectric substrate and, more particularly, to an electromagnetic coupler that operates across various frequency bands and that electromagnetically couples antenna signals between an antenna positioned between two sheets of automotive glass and a circuit outside of the glass.

Discussion of the Related Art

Modern vehicles employ various and many types of antennas to receive and transmit signals for different communications systems, such as terrestrial radio (AM/FM), cellular telephone, satellite radio, dedicated short range communications (DSRC), global navigation satellite systems (GNSS), etc. Further, cellular telephone is expanding into 4G long term evolution (LTE) that requires two antennas to provide multiple-input multiple-output (MIMO) operation. The antennas used for these systems are often mounted to a roof of the vehicle so as to provide maximum reception capability. Further, many of these antennas are often integrated into a common structure and housing mounted to the roof of the vehicle, such as a "shark-fin" roof mounted antenna module. As the number of antennas on a vehicle increases, the size of the structures required to house all of the antennas in an efficient manner and providing maximum reception capability also increases, which interferes with the design and styling of the vehicle. Because of this, automotive engineers and designers are looking for other suitable areas on the vehicle to place antennas that may not interfere with vehicle design and structure.

One of those areas is the vehicle glass, such as the vehicle windshield, which has benefits because glass makes a good dielectric substrate for an antenna. For example, it is known in the art to print AM and FM antennas on the glass of a vehicle where the printed antennas are fabricated with the glass as a single piece. However, those known systems are generally limited in that they can only be placed in a vehicle windshield or other glass surface in areas where viewing through the glass was not necessary.

Because of corrosion, wear and other factors, it is desirable to position an antenna between the two glass layers in a vehicle windshield, which would require an electrical device to allow signals transmitted by the antenna to be able to be coupled to the device and signals received by the antenna to be coupled out of the glass layers to a receiver circuit and at the frequency band of interest.

SUMMARY OF THE INVENTION

The present invention discloses and describes an electromagnetic coupler that couples antenna signals for a wideband antenna positioned between glass layers of an automotive windshield. The coupler includes a first co-planar waveguide (CPW) formed on one side of a glass layer and a second CPW formed on the other side of the glass layer, where the first and second CPWs are a mirror, or near-mirror, and 180° rotated images of each other. Both the first and second CPWs include a conductive plane where removed portions of the plane define a wide CPW section and a narrow CPW section that are electrically coupled to each other, and where the remaining portions of the conductive plane are ground planes, and where the electromagnetic signals are coupled through the glass layer between the wide CPW sections.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an electromagnetic coupler for coupling antenna signals to and from an antenna between glass sheets of an automotive glass is merely exemplary in nature, and is in no way intended to limit the invention or its applications or uses. For example, the discussion herein talks about the antenna being applicable to be adhered to automotive glass. However, as will be appreciated by those skilled in the art, the antenna will have application for other dielectric structures other than automotive structures.

As will be discussed in detail below, the present invention proposes an electromagnetic coupler that couples antenna signals from or to an antenna formed between two glass sheets of, for example, a vehicle windshield. In one specific embodiment, a first coupler couples signals in the high end of the LTE frequency band, i.e., 1.7-2.6 GHz, and a second coupler couples signals in the low end of the LTE frequency band, i.e., 0.7-1.0 GHz, a GPS frequency band, i.e., 1.575 GHz, and a GNSS frequency band, i.e., 1.6 GHz. In one embodiment, the coupler includes coupling sections positioned on the periphery of the windshield, where the width of each coupling section is minimized to reduce the visible area of the coupler. To further reduce the visibility of the coupler, the conductors in the coupler can be made of a transparent conducting material. In other embodiments, which may not be specifically shown herein, the design of the coupler dimensions and/or embedded inductive and capacitive elements are modified to optimize electromagnetic coupling in other frequency bands.

In addition, while the focus for the disclosed coupler is for multi-layer glass structures, the present invention also applies to non-transparent substrates, such as multi-layer plastic surfaces, where the conductors of the antenna structure, including the feed structure, may not be easily accessible due to the multi-layer assembly. For example, in some plastic assemblies there may be inner surfaces that are not easily accessible. The coupling structures discussed herein can be used to provide electromagnetic coupling between the multi-layer structures.

Figure 1:
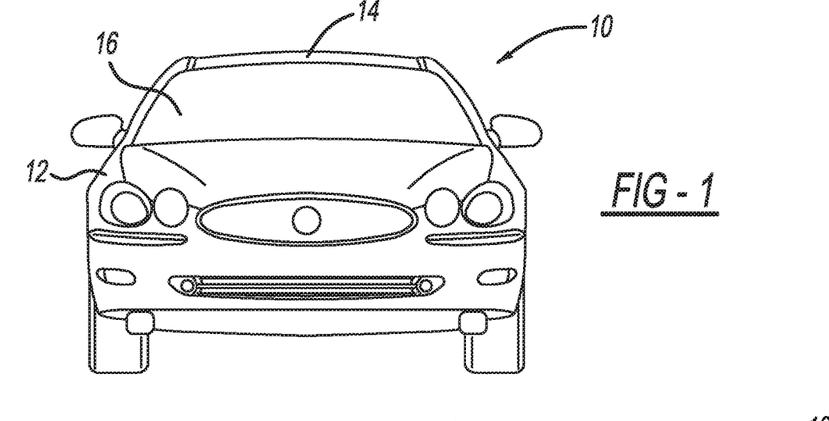
FIG. 1 is a front view of a vehicle showing a vehicle windshield.
Figure 2:
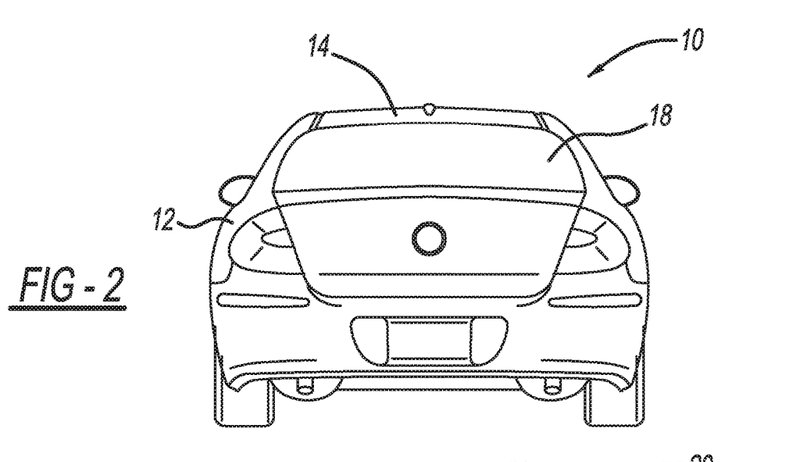
FIG. 2 is a back view of the vehicle showing a vehicle rear window.

FIG. 1 is a front view of a vehicle 10 including a vehicle body 12, roof 14 and windshield 16, and FIG. 2 is a rear view of the vehicle 10 showing a rear window 18.

Figure 3:
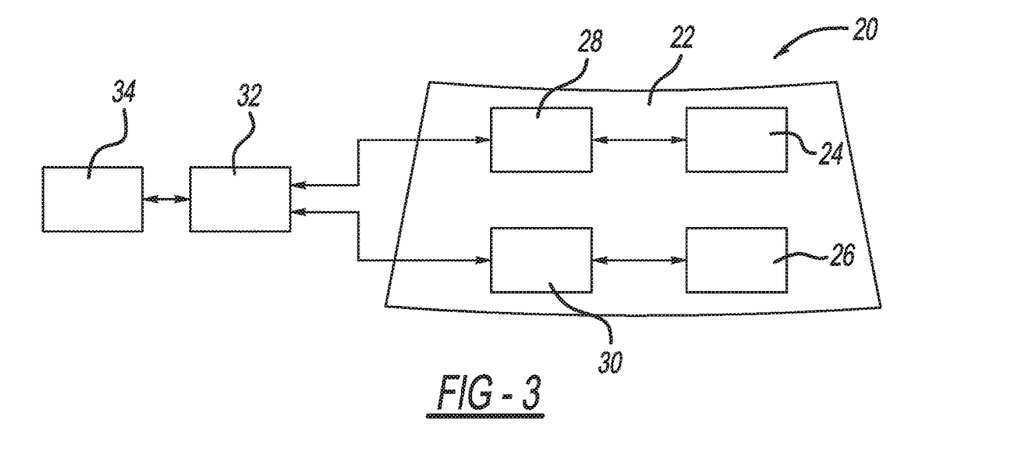
FIG. 3 is a block diagram of an antenna system.

FIG. 3 is an illustration of an antenna system 20 including a vehicle windshield 22, where the windshield 22 includes an outer glass layer, an inner glass layer and a PVB layer therebetween of the type well known to those skilled in the art. The antenna system 20 also includes a first antenna 24 and a second antenna 26 that may be part of a 4G MIMO cellular antenna assembly, where the antenna 24 may operate in the high end of the LTE frequency band, i.e., 1.7-2.6 GHz, and the antenna 26 may operate in the low end of the LTE frequency band, i.e., 0.7-1.0 GHz. The antennas 24 and 26 are provided on an inner surface of one of the inner or outer glass layers or on one of the surfaces of the PVB layer such that they are encapsulated in the windshield 22, where a direct feed line to the antennas 24 and 26 is not possible.

As will be discussed in detail below, the present invention proposes providing electromagnetic coupling through the inner or outer glass layer using a coupler having a portion provided on one of an outer surface of the inner or outer glass layer and preferably the outer surface of the inner glass layer. In the system 20, an electromagnetic coupler 28 is provided for the antenna 24 and an electromagnetic coupler 30 is provided for the antenna 26 for this purpose. A transceiver 34 provided somewhere on the vehicle 10 provides signals to or receives signals from the antennas 24 and 26 through a diplexer 32 in a manner well understood by those skilled in the art.

Figure 4:
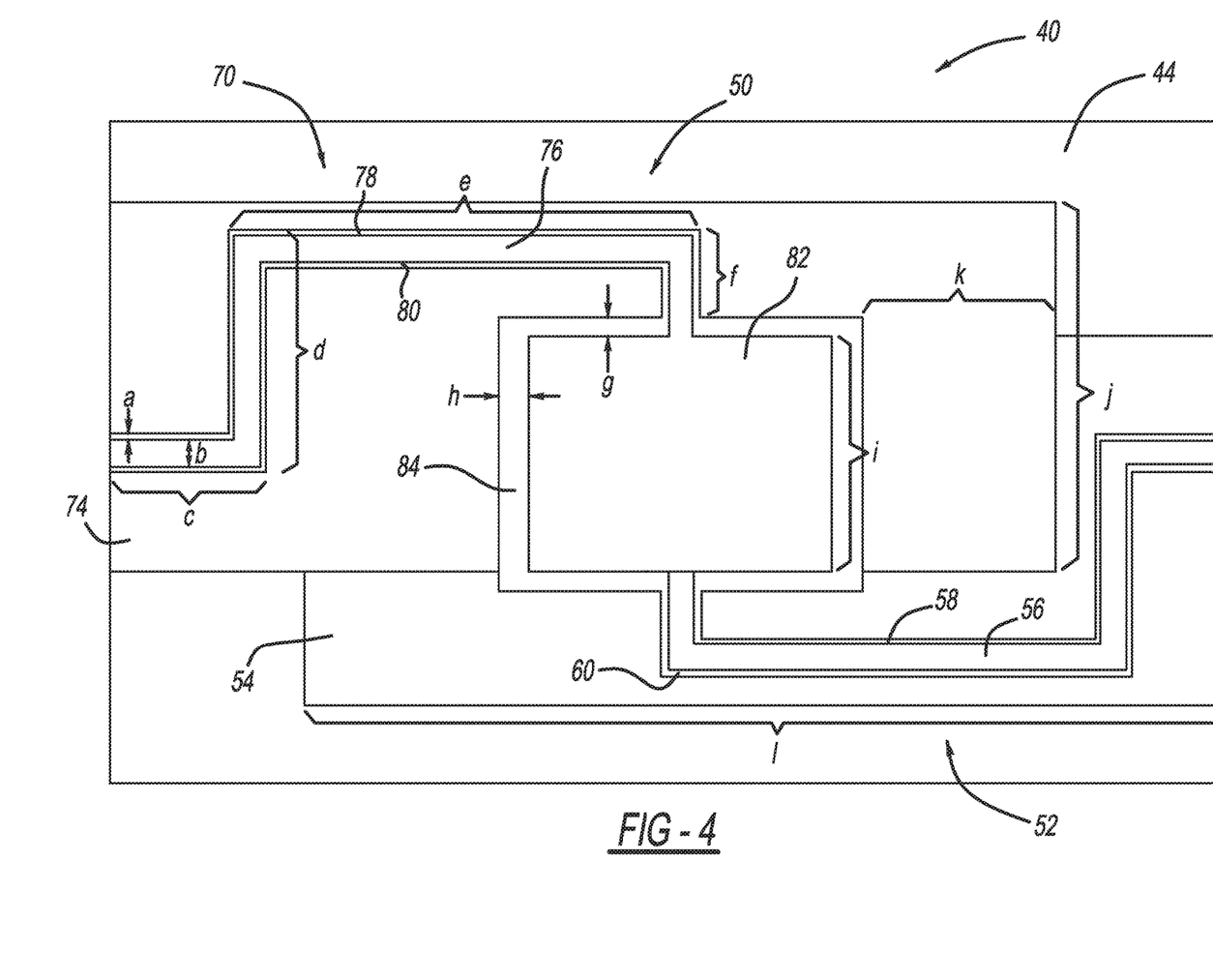
FIG. 4 is a front view of a vehicle windshield showing a low-band electromagnetic coupler.
Figure 5:
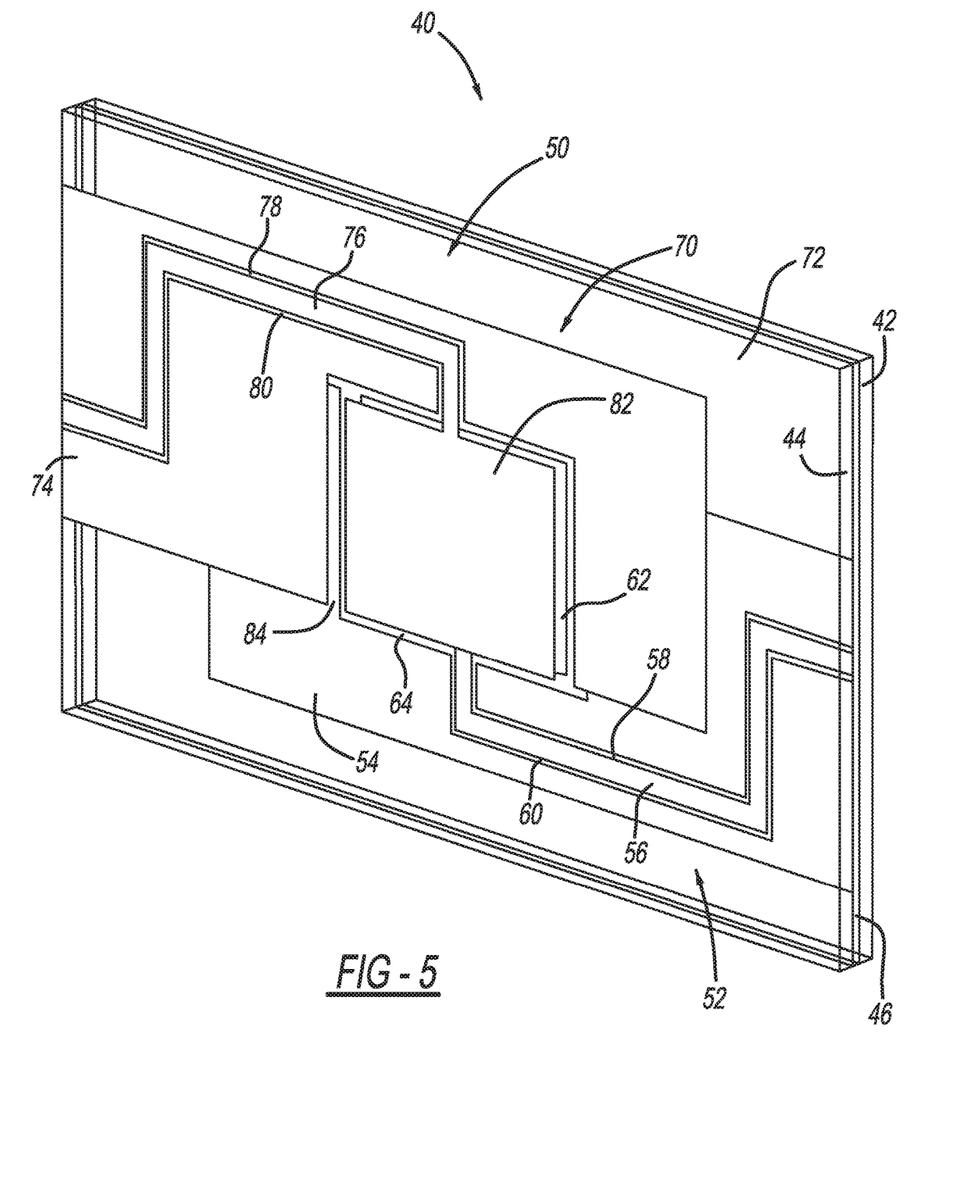
FIG. 5 is an isometric view of the electromagnetic coupler showing FIG. 4.

FIG. 4 is a front view and FIG. 5 is an isometric view of a portion of a vehicle windshield 40 including an outside glass sheet 42, an inside glass sheet 44 and a PVB layer 46 sandwiched therebetween. In this non-limiting embodiment, the antenna (not shown in FIGS. 4 and 5), such as the antenna 26, is provided on an inside surface of the inside sheet 44 so that it is between the sheet 44 and the PVB layer 46. However, this is by way of a non-limiting example in that the antenna can be configured on any of the inside surfaces between the sheets 44 and 42, including the inside surface of the sheet 44, one side of the PVB layer 46, the other side of the PVB layer 46, and the inside surface of the sheet 42. Since the antenna is configured at a location where a feed line cannot be directly connected thereto, the present invention employs electromagnetic coupling of the antenna signals through the glass sheet 44.

In order to provide the electromagnetic coupling, the windshield 40 includes an electromagnetic coupler 50 having a first co-planar waveguide (CPW) 52 formed on the inside surface of the inside glass sheet 44, and a second CPW 70 formed on the outside surface of the inside glass sheet 44, where the CPWs 52 and 70 are a mirror, or near-mirror, and 180° rotated images of each other, as shown. The CPW 52 includes a conductive plane 54, a narrow CPW section 56 defined by gaps 58 and 60 where metal has been removed from the plane 54, and a wide CPW section 62 defined by a gap 64 where metal has been removed from the plane 54. Those areas of the conductive plane 54 outside of the sections 56 and 62 are ground portions of the CPW 52. The CPW 70 includes a conductive plane 74, a narrow CPW section 76 defined by gaps 78 and 80 where metal has been removed from the plane 74, and a wide CPW section 82 defined by a gap 84 where metal has been removed from the plane 74. Those areas of the conductive plane 74 outside of the sections 76 and 82 are ground portions of the CPW 70. The electromagnetic coupling between the CPW 52 and the CPW 70 occurs through the glass sheet 44 between the wide CPW sections 62 and 82.

The wide CPW sections 62 and 82 transition to the narrow CPW sections 56 and 76, respectively, through a transition area where the width of the narrow CPW sections 56 and 76 is the same as the width of the gaps 64 and 84, respectively, to provide proper impedance matching. The exact dimensions and placement of the overlapping wide CPW sections 62 and 82 and the corresponding transitions are optimized to minimize insertion loss over the operating bandwidth while simultaneously minimizing the length of the coupler 50. The narrow CPW sections 56 and 76 meander through the conductive planes 54 and 74 and ultimately turn 90° relative to their original orientation as shown. The width of the wide CPW sections 62 and 82 is greater than their length and the total width of the narrow CPW sections 56 and 76 can be made much less than the width of the wide sections 62 and 82 due to greater field confinement, and thus the 90° turn allows the total width of the coupler 50 to be reduced. The width of the ground portions for both the narrow CPW sections 56 and 76 and the wide CPW sections 62 and 82 is set to be approximately the width of those sections.

The narrow CPW section 76 can be directly connected to a 50Ω coaxial cable (not shown), which is subsequently connected to the diplexer 32. The narrow CPW section 56 can be connected to a CPW fed antenna inside the windshield 40. It is noted that to increase the visible area of the windshield 44, the CPW 52, the CPW 70 and/or the antenna can be made of a transparent conductor. Suitable transparent conductors include, but are not limited to, indium tin oxide (ITO), silver nano-wire, zinc oxide (ZnO), etc. It is further noted that to increase the visible area of the windshield 44, the antennas and all or some of the sections of the CPWs 52 and 70 can be metal grids.

The coupler 50 is intended to operate in the frequency range of 0.5-1.6 GHz in one embodiment. In order to provide this operational frequency range, the dimensions a—l shown in FIG. 4 are identified in Table 1 below.

TABLE 1

| | |
|---|---|
| a | 0.5 mm |
| b | 2.72 mm |
| c | 15.944 mm |
| d | 24.58 mm |
| e | 48.229 mm |
| f | 8.72 mm |
| g | 2 mm |
| h | 3.048 mm |
| I | 24 mm |
| j | 37.72 mm |
| k | 11.72 mm |
| l | 97.186 mm |

Figure 6:
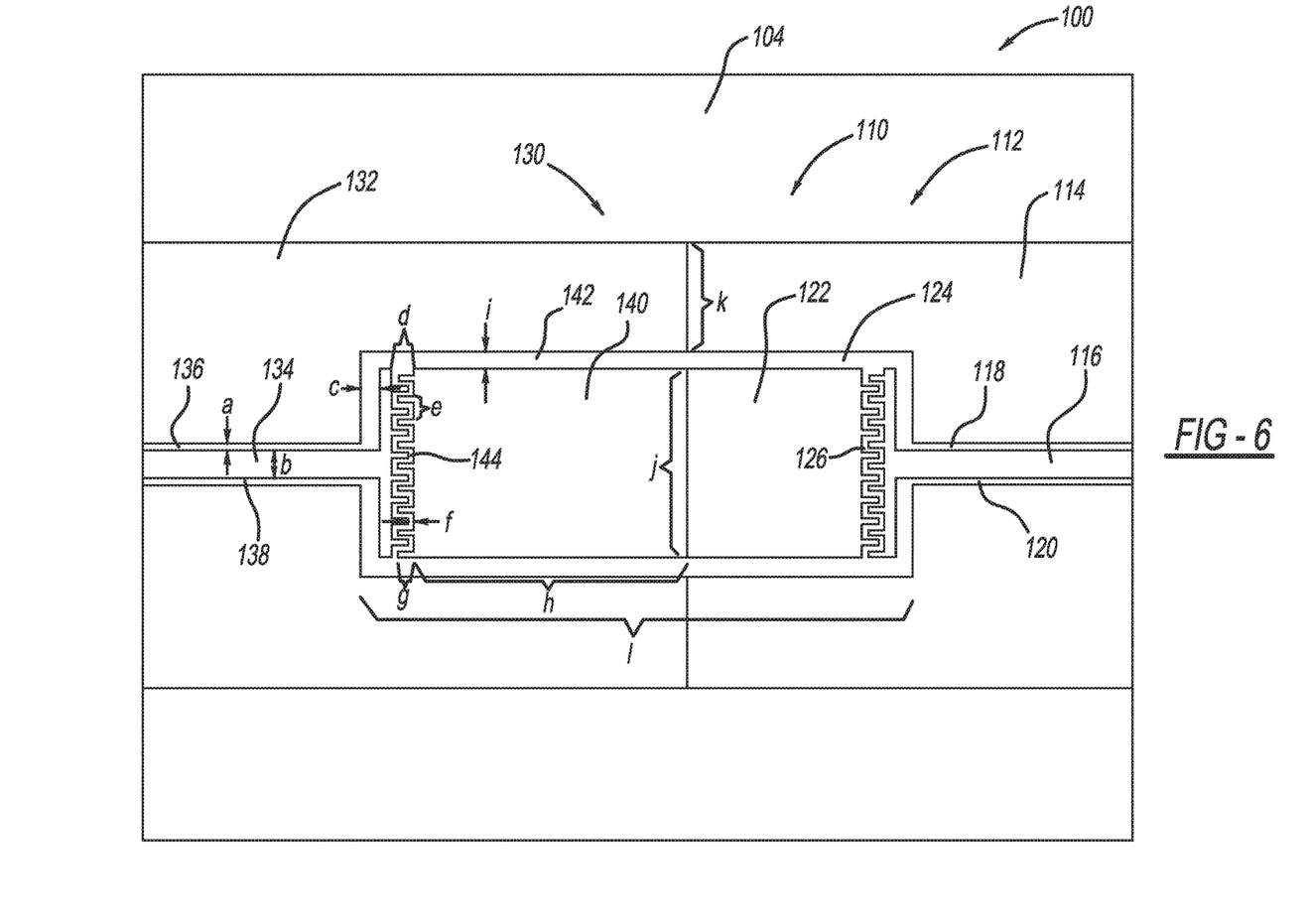
FIG. 6 is a front view of a vehicle windshield showing a high-band electromagnetic coupler.
Figure 7:
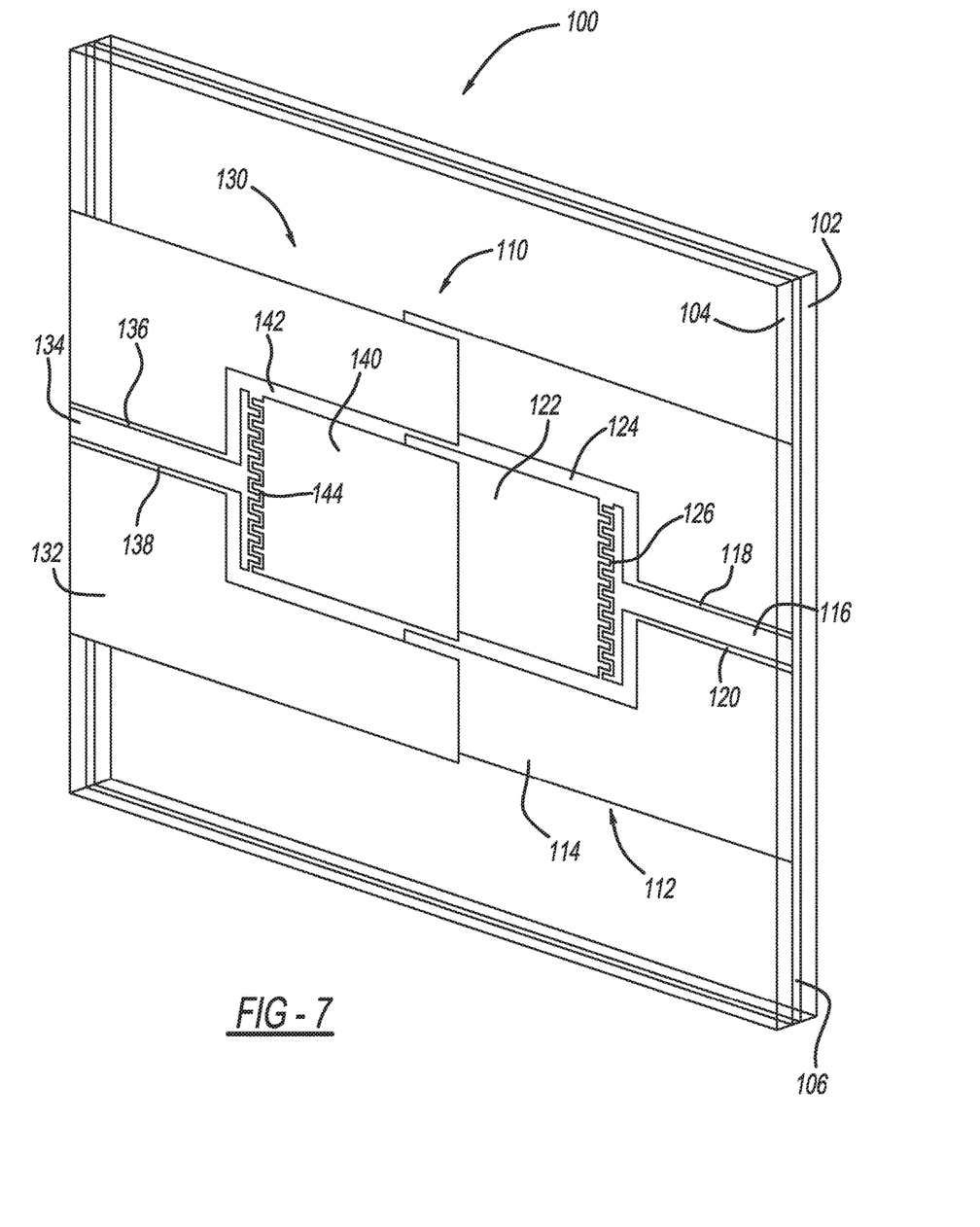
FIG. 7 is an isometric view of the electromagnetic coupler shown in FIG. 6.

FIG. 6 is a front view and FIG. 7 is an isometric view of a portion of a vehicle windshield 100 including an outside glass sheet 102, an inside glass sheet 104 and a PVB layer 106 sandwiched therebetween. In this non-limiting embodiment, the antenna (not shown in FIGS. 6 and 7), such as the antenna 24, is provided on an inside surface of the inside sheet 104 so that it is between the sheet 104 and the PVB layer 106. However, this is by way of a non-limiting example in that the antenna can be configured on any of the inside surfaces between the sheets 104 and 102, including the inside surface of the sheet 104, one side of the PVB layer 106, the other side of the PVB layer 106, and the inside surface of the sheet 102. Since the antenna is configured at a location where a feed line cannot be directly connected thereto, the present invention employs electromagnetic coupling of the antenna signals through the glass sheet 104.

In order to provide the electromagnetic coupling, the windshield 100 includes an electromagnetic coupler 110 having a first CPW 112 formed on the inside surface of the inside glass sheet 104, and a second CPW 130 formed on the outside surface of the inside glass sheet 104, where the CPWs 112 and 130 are a mirror, or near-mirror, and 180° rotated images of each other, as shown. The CPW 112 includes a conductive plane 114, a narrow CPW section 116 defined by gaps 118 and 120 where metal has been removed from the plane 114, and a wide CPW section 122 defined by a gap 124, where metal has been removed from the plane 114. Those areas of the conductive plane 114 outside of the sections 116 and 122 are ground portions of the CPW 112. The CPW 130 includes a conductive plane 132, a narrow CPW section 134 defined by gaps 136 and 138 where metal has been removed from the plane 132, and a wide CPW section 140 defined by a gap 142 where metal has been removed from the plane 132. Those areas of the conductive plane 132 outside of the sections 134 and 140 are ground portions of the CPW 130. The electromagnetic coupling between the CPW 112 and the CPW 130 occurs through the glass sheet 104 between the wide CPW sections 122 and 140.

The wide CPW sections 122 and 140 transition into the narrow CPW sections 116 and 134, respectively, through a transition area where the width of the narrow CPW sections 116 and 134 is the same as the width of the gaps 124 and 142, respectively, to provide proper impedance matching. An interdigital capacitor 126 is etched into the wide CPW section 122 and an interdigital capacitor 144 is etched into the wide CPW section 140 at about 1 mm before the transition area, which creates two traveling wave resonators that are capacitively coupled to one another by the overlapped wide CPW sections 122 and 140, and thereby improve the transmission bandwidth of the coupler 110 over the desired frequency range.

The narrow CPW section 134 can be directly connected to a 50Ω coaxial cable (not shown), which is subsequently connected to the diplexer 32. The narrow CPW section 116 can be connected to a CPW fed antenna inside the windshield 100. It is noted that to increase the visible area of the windshield 100, the CPW 112, the CPW 130 and/or the antenna can be made of a transparent conductor. Suitable transparent conductors include, but are not limited to, indium tin oxide (ITO), silver nano-wire, zinc oxide (ZnO), etc. It is further noted that to increase the visible area of the windshield 100, the antennas and all or some of the sections of the CPWs 112 and 130 can be metal grids.

The coupler 110 is intended to operate in the frequency range of 1.7-2.6 GHz in one embodiment. In order to provide this operational frequency range, the dimensions a—l shown in FIG. 6 are identified in Table 2 below.

TABLE 2

| | |
|---|---|
| a | 0.5 mm |
| b | 2.72 mm |

TABLE 2-continued

| | |
|---|---|
| c | 1.676 mm |
| d | 2 mm |
| e | 2 mm |
| f | 0.5 mm |
| g | 1.5 mm |
| h | 25 mm |
| I | 1.676 mm |
| j | 17.1 mm |
| k | 10 mm |
| l | 47 mm |

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An electromagnetic coupler for coupling electromagnetic antenna signals from an area on one side of a glass substrate to an area on an opposing side of the glass substrate, said coupler comprising:

a first co-planar waveguide (CPW) formed on the one side of the substrate and including a first conductive plane, said first CPW including a first narrow CPW section defined in the first plane by removed metal portions of the first plane and a first wide CPW section defined in the first plane by removed metal portions of the first plane, wherein the first narrow and wide CPW sections are electrically coupled, a first end of the first narrow CPW section being oriented 90° relative to a second end of the first narrow CPW section; and a second co-planar waveguide (CPW) formed on an opposing side of the substrate and including a second conductive plane, said second CPW including a second narrow CPW section defined in the second plane by removed metal portions of the second plane and a second wide CPW section defined in the second plane by removed metal portions of the second plane, wherein the second narrow and wide CPW sections are electrically coupled, a first end of the second narrow CPW section being oriented 90° relative to a second end of the second narrow CPW section.

2. The coupler according to claim 1 wherein one or both of the first and second CPWs include transparent conductors.

3. The coupler according to claim 1 wherein the first narrow CPW section is a meandering section formed in the first conductive plane so that the first narrow CPW section is coupled to the first wide CPW section at the second end of the first narrow CPW section, and wherein the second narrow CPW section is a meandering section formed in the second conductive plane so that the second narrow CPW section is coupled to the second wide CPW section at the second end of the second narrow CPW section.

4. The coupler according to claim 3 wherein the coupler couples electromagnetic signals in the 0.7-1.6 GHz frequency band for one or more of a long term evolution (LTE) antenna, a GPS antenna and a global navigation satellite system (GNSS) antenna.

5. The coupler according to claim 1 wherein the first and second narrow CPW sections comprises straight sections.

6. The coupler according to claim 5 wherein the coupler couples electromagnetic signals in the 1.7-2.6 GHz frequency band for a long term evolution (LTE) antenna.

7. The coupler according to claim 5 wherein the first and second CPWs include an interdigital capacitor extending across the first and second wide CPW sections.

8. The coupler according to claim 1 wherein the first and second CPWs are a mirror, or near-mirror, and 180° rotated images of each other.

9. The coupler according to claim 1 wherein the glass substrate is either an outer glass layer or an inner glass layer of a vehicle windshield.

10. An electromagnetic coupler for coupling electromagnetic antenna signals from an area on one side of a glass substrate to an area on an opposing side of the glass substrate, said coupler comprising:
a first co-planar waveguide (CPW) formed on the one side of the substrate and including a first conductive plane, said first CPW including a first narrow CPW section defined in the first plane by removed metal portions of the first plane and a first wide CPW section defined in the first plane by removed metal portions of the first plane, wherein the first narrow and wide CPW sections are electrically coupled, the first narrow CPW section being oriented 90° relative to the first wide CPW section;
a second co-planar waveguide (CPW) formed on the opposing side of the substrate and including a second conductive plane, said second CPW including a second narrow CPW section defined in the second plane by removed metal portions of the second plane and a second wide CPW section defined in the second plane by removed metal portions of the second plane, wherein the second narrow and wide CPW sections are electrically coupled; and
wherein a gap formed by the removed metal portions of the first plane that defines the first wide CPW section has a width substantially the same as a width of the first narrow CPW section, and a gap formed by the removed metal portions of the second plane that defines the second wide CPW section has a width substantially the same as a width of the second narrow CPW section.

11. An electromagnetic coupler for coupling electromagnetic antenna signals from an area on an inside surface of an outer glass layer or an inner glass layer of a vehicle windshield to an area on an outside surface of the outer glass layer or the inner glass layer, said coupler comprising:
a first co-planar waveguide (CPW) formed on the one side of the substrate and including a first conductive plane, said first CPW including a first narrow CPW section defined in the first plane by removed metal portions of the first plane and a first wide CPW section defined in the first plane by removed metal portions of the first plane, wherein the first narrow and wide CPW sections are electrically coupled, and wherein the first narrow CPW section is a meandering section formed in the first conductive plane so that a first end of the first narrow CPW section coupled to the first wide CPW section is oriented about 90° relative to a second end of the first narrow CPW section; and
a second co-planar waveguide (CPW) formed on the opposing side of the substrate and including a second conductive plane, said second CPW including a second narrow CPW section defined in the second plane by removed metal portions of the second plane and a second wide CPW section defined in the second plane by removed metal portions of the second plane, wherein the second narrow and wide CPW sections are electrically coupled, and wherein the second narrow CPW section is a meandering section formed in the second conductive plane so that a first end of the second narrow CPW section coupled to the second wide CPW section is oriented about 90° relative to a second end of the second narrow CPW section.

12. The coupler according to claim 11 wherein a gap formed by the removed metal portions of the first plane that defines the first wide CPW section has a width substantially the same as a width of the first narrow CPW section, and a gap formed by the removed metal portions of the second plane that defines the second wide CPW section has a width substantially the same as a width of the second narrow CPW section.

13. The coupler according to claim 11 wherein the coupler couples electromagnetic signals in the 0.7-1.6 GHz frequency band for one or more of a long term evolution (LTE) antenna, a GPS antenna and a global navigation satellite system (GNSS) antenna.

14. The coupler according to claim 11 wherein the first and second CPWs are a mirror, or near-mirror, and 180° rotated images of each other.

15. The coupler according to claim 11 wherein one or both of the first and second CPWs include transparent conductors.

16. An electromagnetic coupler for coupling electromagnetic antenna signals from an area on an inside surface of an outer glass layer or an inner glass layer of a vehicle windshield to an area on an outside surface of the outer glass layer or the inner glass layer, said coupler comprising:
a first co-planar waveguide (CPW) formed on the one side of the substrate and including a first conductive plane, said first CPW including a first narrow CPW section defined in the first plane by removed metal portions of the first plane and a first wide CPW section defined in the first plane by removed metal portions of the first plane, said first CPW further including a first interdigital capacitor extending across the first wide CPW section, wherein the first narrow and wide CPW sections are electrically coupled, and wherein the first narrow CPW section is a straight section; and
a second co-planar waveguide (CPW) formed on the opposing side of the substrate and including a second conductive plane, said second CPW including a second narrow CPW section defined in the second plane by removed metal portions of the second plane and a second wide CPW section defined in the second plane by removed metal portions of the second plane, said second CPW further including a second interdigital capacitor extending across the second wide CPW section, wherein the second narrow and wide CPW sections are electrically coupled and wherein the second narrow CPW section is a straight section.

17. The coupler according to claim 16 wherein a gap formed by the removed metal portions of the first plane that defines the first wide CPW section has a width substantially the same as the width of the first narrow CPW section, and a gap formed by the removed metal portions of the second plane that defines the second wide CPW section has a width substantially the same as the width of the second narrow CPW section.

18. The coupler according to claim 16 wherein the coupler couples electromagnetic signals in the 1.7-2.6 GHz frequency band for a long term evolution (LTE) antenna.

19. The coupler according to claim 16 wherein the first and second CPWs are a mirror, or near-mirror, and 180° rotated images of each other.

20. The coupler according to claim 16 wherein one or both of the first and second CPWs include transparent conductors.

\* \* \* \* \*